(12) United States Patent
Trocki

(10) Patent No.: US 10,664,290 B2
(45) Date of Patent: May 26, 2020

(54) APPLICATION ENVIRONMENT THAT IMPLEMENTS NATIVE CODE FUNCTIONALITY IN PROGRESSIVE WEB APPLICATIONS

(71) Applicant: Red Hat, Inc., Raleigh, NC (US)

(72) Inventor: Wojciech J. Trocki, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/052,391

(22) Filed: Aug. 1, 2018

(65) Prior Publication Data

US 2020/0042332 A1 Feb. 6, 2020

(51) Int. Cl.
| | |
|---|---|
| *G06F 3/00* | (2006.01) |
| *G06F 9/44* | (2018.01) |
| *G06F 9/46* | (2006.01) |
| *G06F 13/00* | (2006.01) |
| *G06F 9/445* | (2018.01) |
| *G06F 9/54* | (2006.01) |

(52) U.S. Cl.
CPC .......... *G06F 9/44526* (2013.01); *G06F 9/543* (2013.01); *G06F 9/547* (2013.01)

(58) Field of Classification Search
CPC .................................................. G06F 9/44526
USPC .......................................................... 719/328
See application file for complete search history.

(56) References Cited

U.S. PATENT DOCUMENTS

| | | |
|---|---|---|
| 9,804,834 B1 | 10/2017 | Lopyrev et al. |
| 2016/0253171 A1 | 9/2016 | Zang et al. |
| 2017/0085609 A1 | 3/2017 | Clay et al. |
| 2017/0090950 A1* | 3/2017 | Sakamoto ............... H04L 67/34 |
| 2019/0163453 A1* | 5/2019 | Seksenov ................. G06F 8/40 |

OTHER PUBLICATIONS

Author Unknown, "Building web apps in WebView," https://developer.android.com/guide/webapps/webview, last updated Jul. 17, 2018, Google LLC, 11 pages.
Author Unknown, "Introduction to Progressive Web App Architectures," developers.google.com/web/ilt/pwa/introduction-to-progressive-web-app-architectures, Apr. 9, 2018, 44 pages.
Author Unknown, "Installing Capacitor," Capacitor Beta, capacitor.ionicframework.com/docs/getting-started/, accessed Jul. 28, 2018, Drifty Co., 1 page.
Cunha, Diogo, "Building Progessive Web Apps," www.nearform.com/building-progessive-web-apps/, Apr. 30, 2018, Nearform Ltd., 21 pages.
Guan, David, et al., "Using Service Workers," MDN Web Docs, developer.mozilla.org/en-US/docs/Web/API/Service_Worker_API/Using_Service_Workers#, last updated Jul. 3, 2018, Mozilla, 23 pages.

(Continued)

*Primary Examiner* — Timothy A Mudrick
(74) *Attorney, Agent, or Firm* — Withrow & Terranova, PLLC

(57) ABSTRACT

An application environment that implements native code functionality in progressive web applications. An application executing in a mobile device operating system of a mobile device, the application comprising a plug-in bridge and a first native plug-in, loads a first progressive web application (PWA) from a host device that hosts the first PWA. The first PWA invokes the first native plug-in via the plug-in bridge to implement a first operation on the mobile device.

17 Claims, 10 Drawing Sheets

(56) References Cited

OTHER PUBLICATIONS

Hans, Thorsten, et al., "Modern Cross-Platform Business Applications with Angular, Cordova, Electron, PWA & Serverless Backends," Powerpoint Presentation, Think Tecture, May 22, 2018, 29 pages.
Looper, Jen, "What is a WebView," Mobile, Telerik Developer Network, Nov. 9, 2015, Progress Software Corporation, 14 pages.
Thakur, Parbat, "Evaluation and Implementation of Progressive Web Application," Thesis, Helsinki Metropolia University of Applied Sciences, Apr. 6, 2018, 40 pages.
Tubio, Fernando, "Using Cordova Plugins in Hosted Web Apps," github.com/pwa-builder/ManifoldJS/wiki/Using-Cordova-Plugins-in-Hosted-Web-Apps, Nov. 27, 2015, Github, 9 pages.

* cited by examiner

APPLICATION ENVIRONMENT THAT IMPLEMENTS NATIVE CODE FUNCTIONALITY IN PROGRESSIVE WEB APPLICATIONS

TECHNICAL FIELD

The examples relate generally to progressive web applications, and in particular to an application environment that implements native code functionality in progressive web applications.

BACKGROUND

Progressive web applications are applications hosted on a web server, which, when run on a network-attached device, such as a mobile device, provide a user interface and functionality that simulates a native application running on the network-attached device.

SUMMARY

The examples implement an application environment that implements native code functionality in progressive web applications (PWAs). Among other advantages, the examples implement a framework whereby a PWA can execute on different mobile operating systems and access native code on the different mobile operating systems by using the same native code invocations irrespective of the particular mobile operating system. In this manner, the PWA need not be written differently for each different mobile operating system. Moreover, the examples allow proprietary code to be distributed in executable code form to the mobile operating systems and later invoked by the PWA to eliminate a need to insert proprietary code into the PWA that can relatively easily be viewed and discovered due to the nature of PWAs.

In one example a method is provided. The method includes loading, by an application executing in a mobile device operating system of a mobile device, the application comprising a plug-in bridge and a first native plug-in, a first PWA from a host device that hosts the first PWA. The method further includes invoking, by the first PWA on the mobile device, the first native plug-in via the plug-in bridge to implement a first operation on the mobile device.

In another example, a mobile device is provided. The mobile device includes a memory and a processor device coupled to the memory. The processor device is to load, by an application executing in a mobile device operating system of the mobile device, the application comprising a plug-in bridge and a first native plug-in, a first PWA from a host device that hosts the first PWA. The processor device is further to invoke, by the first PWA, the first native plug-in via the plug-in bridge to implement a first operation on the mobile device.

In another example a computer program product stored on a non-transitory computer-readable storage medium is provided. The computer program product includes instructions to cause a processor device to load, by an application executing in a mobile device operating system of a mobile device, the application comprising a plug-in bridge and a first native plug-in, a first PWA from a host device that hosts the first PWA. The instructions further cause the processor device to invoke, by the first PWA on the mobile device, the first native plug-in via the plug-in bridge to implement a first operation on the mobile device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
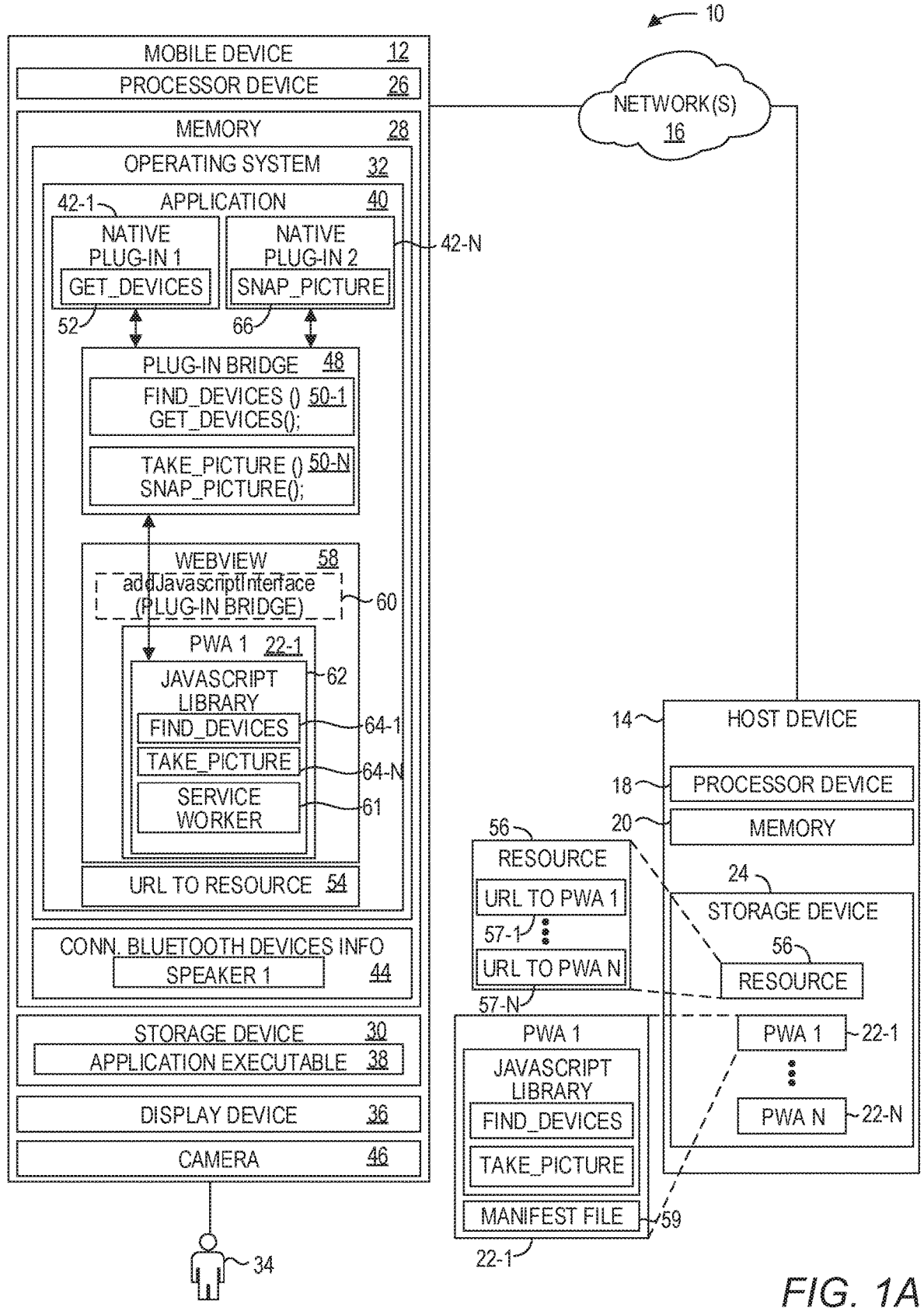
FIG. 1A is a block diagram of an environment in which examples disclosed herein may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first operation" and "second operation," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

Progressive web applications (PWAs) are applications hosted on a web server, which, when run on a network-attached device, such as a mobile device, provide a user interface and functionality that simulates a native application running on the network-attached device. Often functionality that may be desirable to access on a mobile device is implemented via native code functionality. If a PWA needs to access native code, the developer typically distributes the PWA as an application store application that contains the desired native code functionality. However, application store distribution eliminates many of the advantages of a PWA. For example, one advantage of a PWA is that the PWA may be revised or updated by simply altering the PWA on the web server that hosts the PWA. The next time the PWA is invoked by a network-attached device, the network-attached device will load the new revised PWA in a manner that is transparent to the user. Application store distribution, on the other hand, is substantially more complex and time-consuming, and requires a series of steps dictated by the application store owner.

The examples disclosed herein implement an application environment that implements native code functionality in progressive web applications. Among other advantages, the examples implement a framework whereby a PWA can execute on different mobile operating systems and access native code on the different mobile operating systems by using the same native code invocations irrespective of the particular mobile operating system. In this manner, the PWA need not be written differently for each different mobile operating system. Moreover, the examples allow proprietary code to be distributed in executable code form to the mobile operating systems and later invoked by the PWA to eliminate a need to insert proprietary code into the PWA that can relatively easily be viewed and discovered due to the nature of PWAs.

In particular, the application environment includes a mobile device application that is, in one example, loaded onto the mobile device via a mobile device application store. The mobile device application includes one or more native plug-ins, a plug-in bridge that is configured to communicate with a PWA and the one or more native plug-ins, and a PWA-locating mechanism for locating the PWA. A user initiates, via the application, a request for the PWA, and the application loads the PWA from a web server via a uniform resource locator. The PWA has access to an exposed javascript application programming interface that invokes the native plug-ins via the plug-in bridge. The PWA may be updated or revised by simply altering the PWA on the web server, and without a need to update the application on the mobile device. The next time the user initiates the PWA via the application, the application will load the PWA from the web server via the uniform resource locator and thereby initiate the new updated PWA, thereby eliminating the need to distribute updated versions of the PWA via the application store.

FIG. 1A is a block diagram of an environment 10 in which examples disclosed herein may be practiced. The environment 10 includes a mobile device 12 and host device 14 that are communicatively coupled to one another by one or more networks 16. The host device 14 includes a processor device 18 and a memory 20. The host device 14, in some examples, comprises a web server that hosts web applications, including one or more progressive web applications (PWAs) 22-1-22-N that may be maintained, for example, in a storage device 24 to which the host device 14 is communicatively coupled. The storage device 24 may be integrated into the host device 14 or accessible via the one or more networks 16. The term "PWA" as used herein, refers to web applications that: 1) reside on a server and are served upon request using Hypertext Transfer Protocol Secure (HTTPS) to a network-attached device, 2) implement functionality on that network-attached device via at least one service worker as discussed, for example, at developer.mozilla.org/en-US/docs/Web/API/Service_Worker_API/Using_Service_Workers, and 3) include a web application manifest that provides information about the web application (such as, for example, its name, author, icon, and description) in a JavaScript Object Notation (JSON) text file.

The mobile device 12 also includes a processor device 26, a memory 28, and a storage device 30 to which the mobile device 12 is communicatively coupled. The storage device 30 may be integrated into the mobile device 12 or accessible via one or more networks 16. The mobile device 12 runs a mobile device operating system 32, which may comprise, by way of non-limiting example, an Apple® iOS operating system, an Android® operating system, or the like.

In response to input from a user 34, such as via a touch-sensitive display device 36 for example, the operating system 32 accesses an application executable 38 maintained on the storage device 30 and initiates an application 40 from the application executable 38. The application 40 initiates one or more native plug-ins 42-1-42-N (generally, native plug-ins 42). In one Android operating system example, the native plug-ins 42 may be identified in a list, and each native plug-in 42 may be initiated using the following webView invocation: webView.addJavascriptInterface(plugin.getPluginInterface( ), plugin.getPluginNamespace( )). The native plug-ins 42 comprise executable code instructions that comprise machine code that is directly executable, without interpretation or compiling, by the processor device 26 of the mobile device 12. The native plug-ins 42 may, for example, implement functionality, sometimes referred to as native functionality, associated with the mobile device 12 that would not otherwise be accessible to a PWA 22. For example, the operating system 32 may not directly allow a PWA 22 to identify connected Bluetooth devices that are actively connected to the mobile device 12, and/or may not allow a PWA 22 to directly access a camera 46 of the mobile device 12.

In other examples, the native plug-ins 42 may implement proprietary functionality developed by a manufacturer of a PWA 22. Because the native plug-ins 42 comprise machine code, it would be difficult or impossible for an individual who has access to the mobile device 12 to discern how the native plug-in 42 operates. In comparison, if the proprietary functionality were implemented on the mobile device 12 via interpretable instructions, one could relatively easily discern how such functionality was implemented.

The application 40 also initiates a plug-in bridge 48. The plug-in bridge 48 offers one or more bridge functions 50-1-50-N (generally, bridge functions 50) that are invocable by a PWA 22. Each bridge function 50, in response to being invoked by a PWA 22, invokes a plug-in function of a native plug-in 42, which operates to implement an operation on the mobile device 12. The term "function" as used herein refers to any functional unit that can be invoked, such as a subroutine, a function, a method of an object, an object, or the like. The phrase "invoke a function" is used herein to refer to passing control to such functional unit, and may take any form such as a call to a function, an invocation of a method of an object, an invocation of an application programming interface (API), or the like. The phrase "entry point" refers to the interface of the invoked function.

As an example, a PWA 22 may invoke the bridge function 50-1 "FIND_DEVICES" to obtain the identity of all Bluetooth devices that are actively connected to the mobile device 12. The bridge function 50-1, once invoked, invokes a GET_DEVICES function 52 of the native plug-in 42-1. The GET_DEVICES function 52 accesses connected Bluetooth devices information 44 and returns the identity of each Bluetooth device that is actively connected to the mobile device 12 to the bridge function 50-1. The bridge function 50-1 returns the identity of each Bluetooth device that is actively connected to the mobile device 12 to the PWA 22.

After being initiated by the user 34, the application 40 accesses a uniform resource locator (URL) 54 that refers to a resource 56 that identifies the plurality of PWAs 22, and a corresponding plurality of URLs 57-1-57-N that refer to the plurality of PWAs 22-1-22-N. The application 40 may present, on the display device 36, the plurality of PWA identifiers that correspond to the plurality of PWAs 22. The PWA identifiers, for example, may comprise labels that describe the PWAs 22. The user 34 may then select a PWA 22 by, for example, touching the location on the display device 36 that contains the label of the particular PWA 22. For purposes of illustration, assume that the user 34 selects the PWA 22-1. In response to receiving the user input that selects the PWA identifier that corresponds to the PWA 22-1, the application 40 loads the PWA 22-1 from the host device 14. In one example, the application 40 initiates the PWA 22-1 in a webview 58 that includes a rendering engine for rendering web pages. The webview 58 provides web browser functionality, and is available in, for example, the Android® operating system, the Apple® iOS operating system, and the like. The PWA 22-1 includes a web application manifest file 59 that provides information about the PWA 22-1 (such as, for example, a name, author, icon, and description of the PWA 22-1) in a JSON text file. In one example, the application 40 provides access to the plug-in bridge 48 via a mechanism that exposes Java interfaces, such as, by way of non-limiting example, an addJavascriptInterface(Object, String) method 60. The PWA 22-1 may initiate one or more service workers 61. The service workers may provide background tasks concurrently with the execution of the PWA 22-1, such as accessing data via the network 16, establishing a data cache, or any other background tasks. The PWA 22-1 includes a javascript library 62 that contains function invocations 64-1, 64-N for invoking the native plug-ins 42-1, 42-N via the plug-in bridge 48. In particular, the javascript library 62 may include a function invocation 64-1 that invokes the bridge function 50-1, which in turn invokes the GET_DEVICES function 52 of the native plug-in 42-1 to obtain the identity of each Bluetooth device that is actively connected to the mobile device 12. The javascript library 62 may also include a function invocation 64-N that invokes the bridge function 50-N, which in turn invokes a SNAP_PICTURE function 66 of the native plug-in 42-N to cause the camera 46 to take a picture.

In this manner, the PWA 22-1 can invoke native functionality on the mobile device 12. Among other advantages, as will be illustrated below, even though the native functionality may be implemented differently on different mobile device operating systems, the PWA 22-1 need not be written differently for each different mobile device operating system, because the PWA 22-1 invokes the plug-in bridge 48, which can then call the appropriate native plug-in 42 in a manner that is unknown to the PWA 22-1. Moreover, the application 40 provides a protected application environment in which the PWA 22-1 can operate. If the PWA 22-1 is invoked outside of the application 40, such as by entering the URL 57-1 into a browser, the plug-in bridge 48 will not be available, and the PWA 22-1 will not be able to invoke the native plug-ins 42. The PWA 22-1 may be updated or otherwise modified on the host device 14 and, the next time the user 34 initiates the PWA 22-1 via the application 40, the updated and revised version of the PWA 22-1 will be loaded by the application 40, without a need to update the application 40. This eliminates a need to comply with steps and authorization necessary to update applications on the mobile device 12, which can substantially delay the correction of a problem with such an application.

It is noted that, because the application 40 is a component of the mobile device 12, functionality implemented by the application 40 may be attributed to the mobile device 12 generally. Moreover, in examples where the application 40 comprises software instructions that program the processor device 26 to carry out functionality discussed herein, functionality implemented by the application 40 may be attributed herein to the processor device 26. Similarly, because the PWA 22-1 is, once loaded and executed on the mobile device 12, a component of the mobile device 12, functionality implemented by the PWA 22-1 may also be attributed to the mobile device 12 or the processor device 26.

Figure 1B:
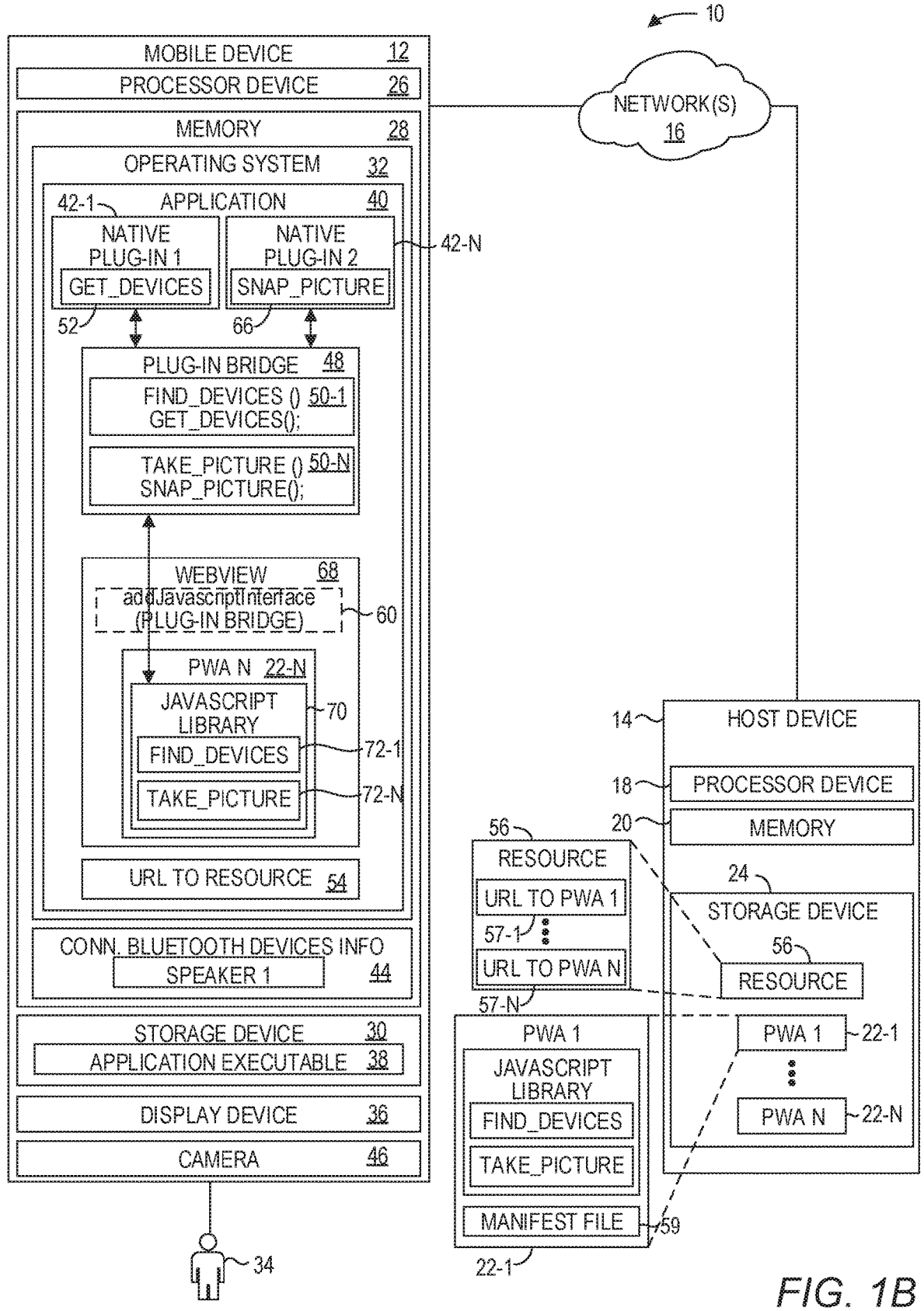
FIG. 1B is a block diagram of the environment illustrated in FIG. 1A at a subsequent point in time.

FIG. 1B is a block diagram of the environment 10 at a later point in time than that illustrated in FIG. 1A. After initiating the PWA 22-1 as illustrated in FIG. 1A, the user 34 decides to initiate the PWA 22-N. The user 34 enters input that causes the application 40 to access the URL 54 and to present, on the display device 36, the plurality of PWA identifiers that correspond to the plurality of PWAs 22. In this example, the user 34 selects the PWA 22-N. In response to receiving the user input that selects the PWA identifier that corresponds to the PWA 22-N, the application 40 loads the PWA 22-N from the host device 14. The application 40 initiates the PWA 22-N in a webview 68 that includes a rendering engine for rendering web pages. The application 40 provides access to the plug-in bridge 48 via the addJavascriptInterface(Object, String) method 60. The PWA 22-N includes a javascript library 70 that contains function invocations 72-1, 72-N for invoking the native plug-ins 42-1, 42-N via the plug-in bridge 48. In particular, the javascript library 70 may include a function invocation 72-1 that invokes the bridge function 50-1, which in turn invokes the GET_DEVICES function 52 of the native plug-in 42-1 to obtain the identity of each Bluetooth device that is actively connected to the mobile device 12. The javascript library 70 may also include a function invocation 72-N that invokes the bridge function 50-N, which in turn invokes the SNAP_PICTURE function 66 of the native plug-in 42-N to cause the camera 46 to take a picture. Note that even though the PWA 22-N is different from the PWA 22-1, and may implement completely different functionality than that implemented by the PWA 22-1, the application 40 provides to the PWA 22-N the same operating environment that includes the native plug-ins 42 and plug-in bridge 48.

Figure 2:
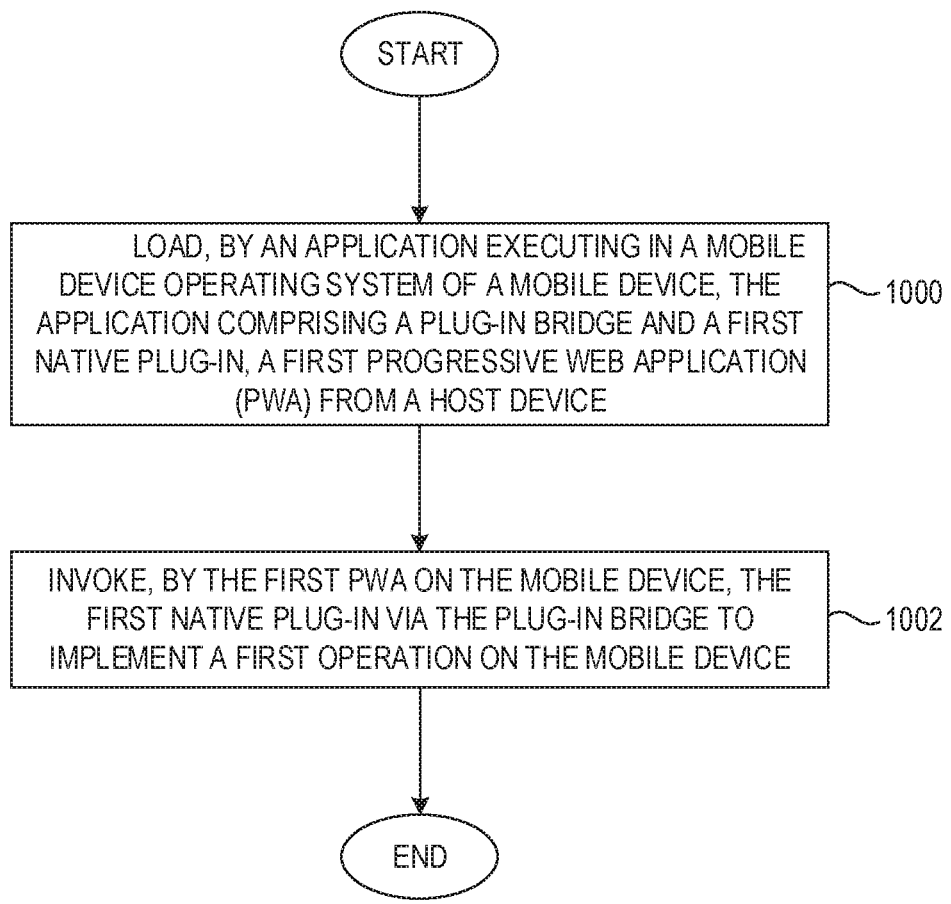
FIG. 2 is a flowchart of a method for providing an application environment that implements native code functionality in progressive web applications (PWAs) according to one example.

FIG. 2 is a flowchart of a method for providing an application environment that implements native code functionality in progressive web applications according to one example. FIG. 2 will be discussed in conjunction with FIG. 1A. The application 40 executes in the mobile device operating system 32 of the mobile device 12. The application 40 includes the plug-in bridge 48 and the native plug-in 42-1. The application 40 loads the PWA 22-1 from the host device 14 that hosts the PWA 22-1 (FIG. 2, block 1000). The PWA 22-1 invokes the native plug-in 42-1 via the plug-in bridge 48 to implement an operation on the mobile device 12 (FIG. 2, block 1002). The operation implemented by the PWA 22-1 in this example is the identification of connected Bluetooth devices that are actively connected to the mobile device 12. However, a PWA 22 may implement any operation on the mobile device 12, such as controlling a camera or other sensor on the mobile device 12, obtaining information about the mobile device 12, implementing functionality on the mobile device 12 that is provided by the manufacturer of the PWA 22, or the like.

Figure 3:
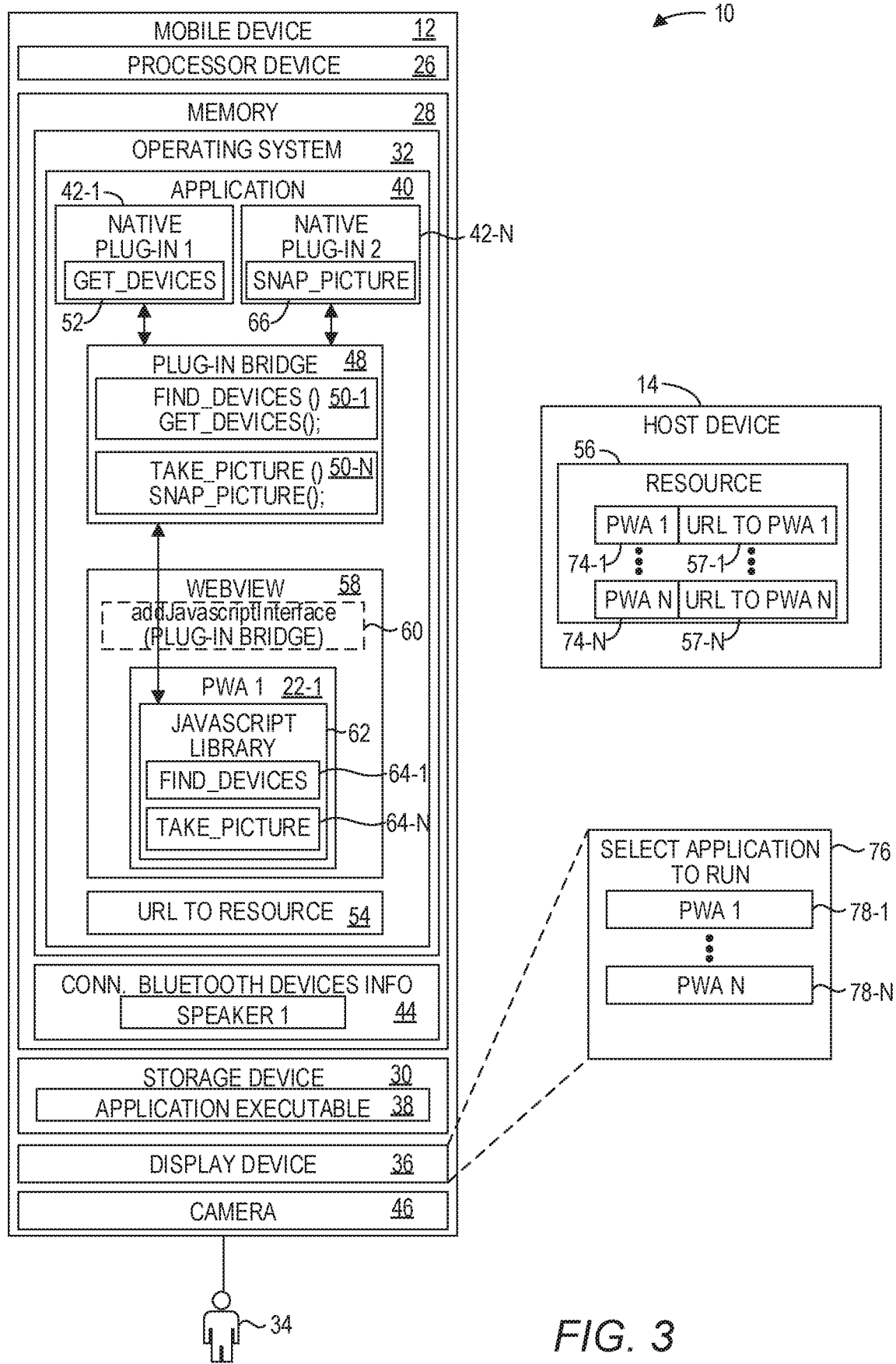
FIG. 3 is a block diagram of the environment illustrated in FIG. 1A illustrating the presentation of PWA identifiers to a user according to one example.

FIG. 3 is a block diagram of the environment 10 illustrating the presentation of PWA identifiers to the user 34 according to one example. In this example, the application 40 accesses the resource 56, which comprises a plurality of PWA identifiers 74-1-74-N and corresponding URLs 57-1-57-N. Each URL 57 contains a reference to the location of the PWA 22 that corresponds to the PWA identifier 74 to which the URL 57 corresponds. The application 40 generates a user interface 76 that provides a plurality of PWA labels 78-1-78-N which correspond to the PWA identifiers 74-1-74-N. The user 34 may then select a particular PWA label 78 to cause the loading and execution of the corresponding PWA 22.

Figure 4:
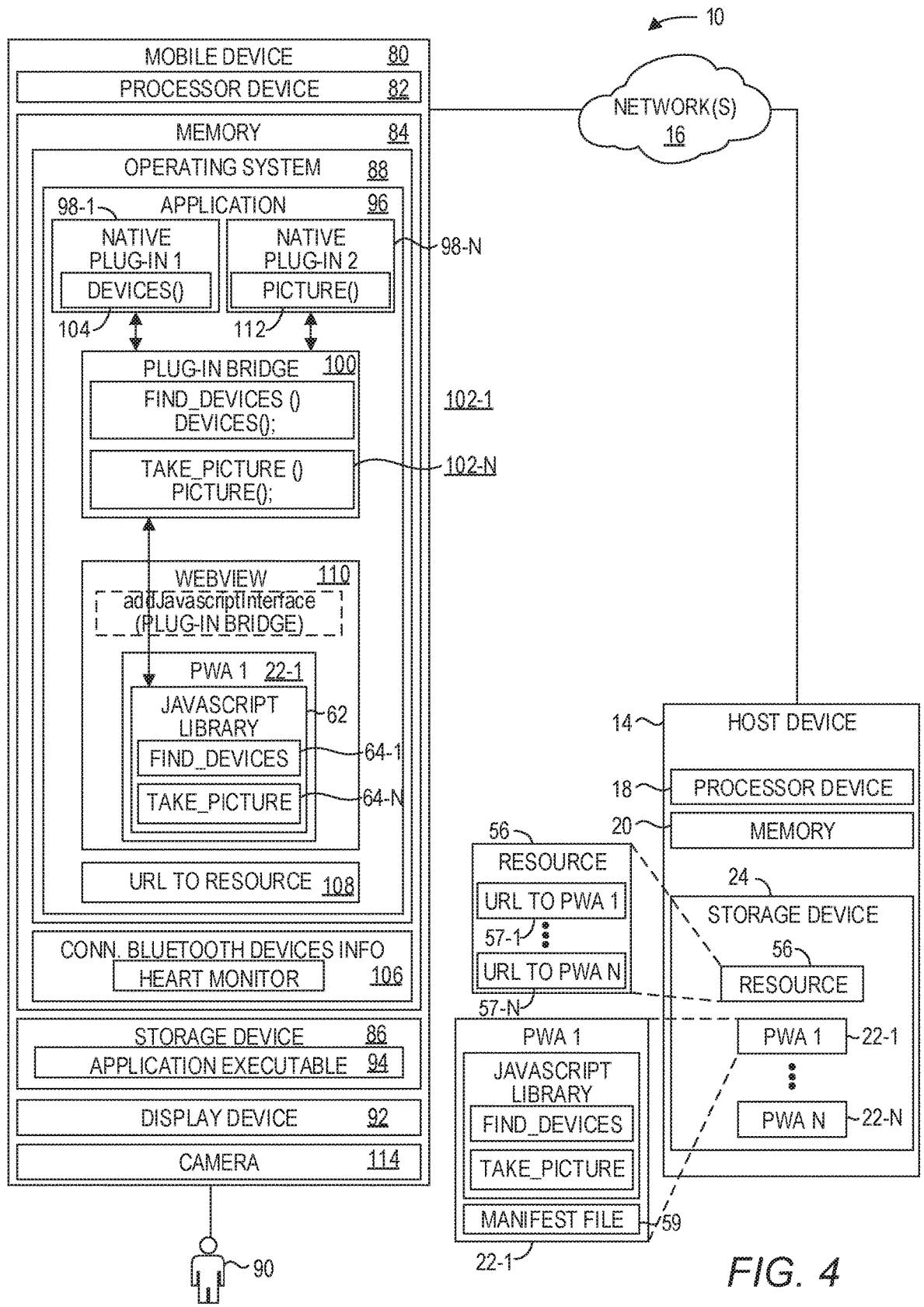
FIG. 4 is a block diagram of the environment illustrated in FIG. 1A according to another example.

FIG. 4 is a block diagram of the environment 10 according to another example. In this example, a mobile device 80 includes a processor device 82, a memory 84, and a storage device 86 to which the mobile device 80 is communicatively coupled. The storage device 86 may be integrated into the mobile device 80 or accessible via the one or more networks 16. The mobile device 80 is largely controlled by a mobile device operating system 88, which may comprise, by way of non-limiting example, an Apple® iOS operating system, an Android® operating system, or the like. In this example, the mobile device operating system 88 is a different mobile device operating system than the mobile device operating system 32 illustrated in FIG. 1. For example, the mobile device operating system 32 illustrated in FIG. 1 may comprise the Apple® iOS operating system, and the mobile device operating system 88 may comprise the Android® operating system.

In response to input from a user 90, such as via a touch-sensitive display device 92 for example, the operating system 88 accesses an application executable 94 maintained on the storage device 86 and initiates an application 96 from the application executable 94. The application 96 may be substantially similar to the application 40 discussed above except as otherwise noted herein. The application 96 initiates one or more native plug-ins 98-1-98-N (generally, native plug-ins 98). In this example, the native plug-in 98-1 implements similar functionality to the native plug-in 42-1 illustrated in FIG. 1, and the native plug-in 98-N implements similar functionality to the native plug-in 42-N. The native plug-ins 98 comprise executable code instructions that comprise machine code that is directly executable, without interpretation or compiling, by the processor device 82 of the mobile device 80.

The application 96 also initiates a plug-in bridge 100. The plug-in bridge 100 offers one or more bridge functions 102-1-102-N (generally, bridge functions 102) that are invocable by a PWA 22. Each bridge function 102, in response to being invoked by a PWA 22, invokes a plug-in function of a native plug-in 98, which operates to implement an operation on the mobile device 80.

As an example, a PWA 22 may invoke the bridge function 102-1 "FIND_DEVICES" to obtain the identity of all Bluetooth devices that are actively connected to the mobile device 80. The bridge function 102-1, once invoked, invokes a DEVICES function 104 of the native plug-in 98-1. The DEVICES function 104 accesses connected Bluetooth devices information 106 and returns to the bridge function 102-1 the identity of each Bluetooth device that is actively connected to the mobile device 80. The bridge function 102-1 returns the identity of each Bluetooth device that is actively connected to the mobile device 80 to the PWA 22.

Note that the name of the DEVICES function 104 of the native plug-in 98-1 differs from the name of the GET_DEVICES function 52 of the native plug-in 42-1. However, because a PWA 22 invokes the bridge function 102-1 rather than the DEVICES function 104 directly, the plug-in bridge 100 can be developed specifically for the mobile device operating system 88 and directly invoke the DEVICES function 104, and the PWA 22 can invoke the bridge function 102-1 irrespective of the particular mobile device operating system.

After being initiated by the user 90, the application 96 accesses a URL 108 that refers to the resource 56 that identifies the plurality of PWAs 22, and a corresponding plurality of URLs 57-1-57-N that refer to the plurality of PWAs 22. The application 96 may present, on the display device 92, the plurality of PWA identifiers that correspond to the plurality of PWAs 22. The PWA identifiers, for example, may comprise labels that describe the PWAs 22. The user 90 may then select a PWA 22 by, for example, touching a location on the display device 92 that contains the PWA label of the particular PWA 22. For purposes of illustration, assume that the user 90 selects the PWA 22-1. In response to receiving the user input that selects the PWA identifier that corresponds to the PWA 22-1, the application 96 loads the PWA 22-1 from the host device 14. In one example, the application 96 initiates the PWA 22-1 in a webview 110 that includes a rendering engine for rendering web pages, as discussed above with regard to the webview 58. The PWA 22-1 includes the javascript library 62 that contains function invocations 64-1, 64-N for invoking the native plug-ins 98-1, 98-N via the plug-in bridge 100. In particular, the javascript library 62 may include a function invocation 64-1 that invokes the bridge function 102-1, which in turn invokes the DEVICES function 104 of the native plug-in 98-1 to obtain the identity of each Bluetooth device that is actively connected to the mobile device 80. The javascript library 62 may also include a function invocation 64-N that invokes the bridge function 102-N, which in turn invokes a PICTURE function 112 of the native plug-in 98-N to cause a camera 114 to take a picture.

In this manner, the PWA 22-1 can invoke native functionality on the mobile device 80 in a same manner as the PWA 22-1 invoked native functionality on the mobile device 12, even though the native plug-in entrypoints of the native plug-ins 98 differ from the native plug-in entrypoints of the native plug-ins 42.

Figure 5:
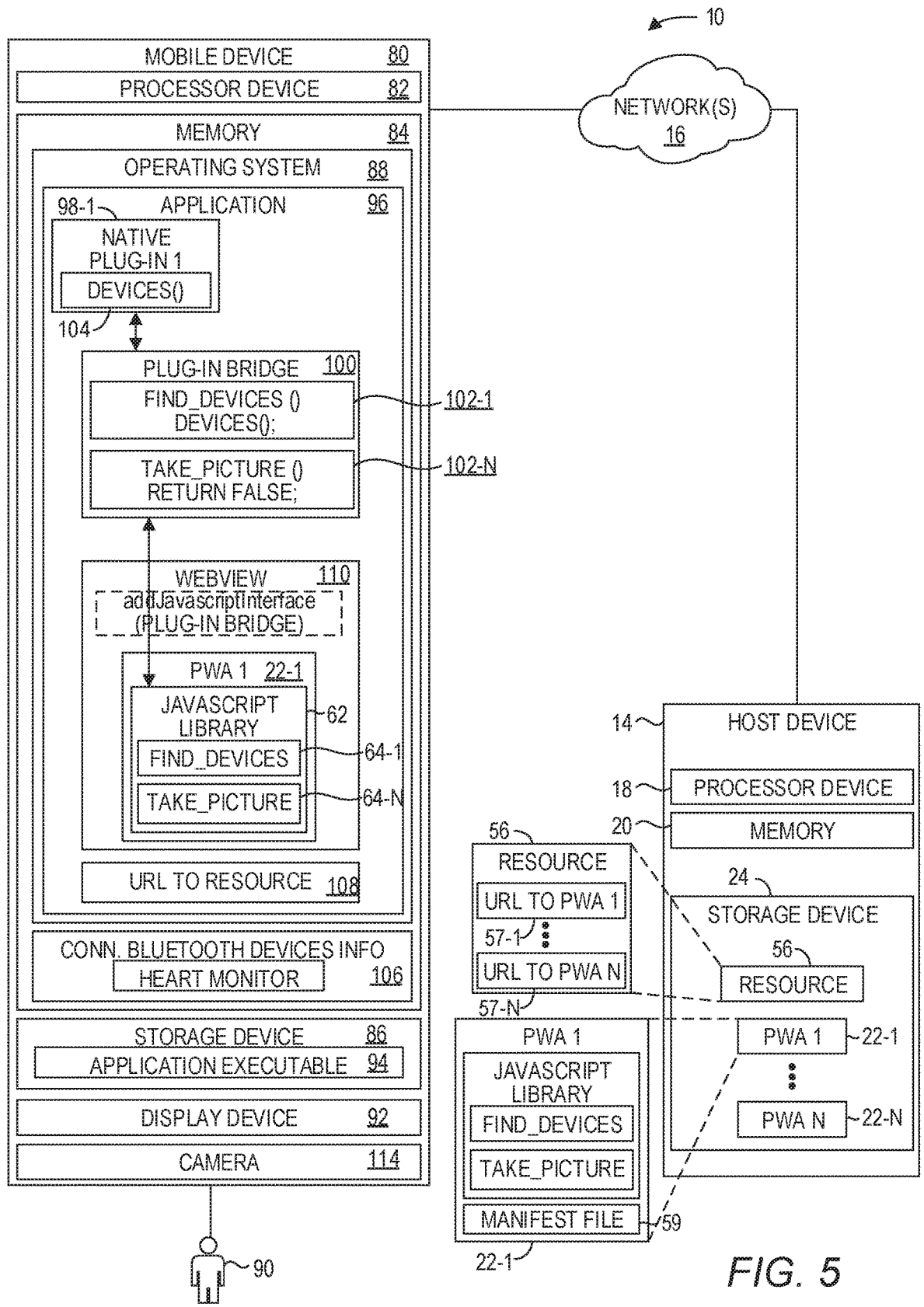
FIG. 5 is a block diagram of the environment illustrated in FIG. 4 according to another example.

FIG. 5 is a block diagram of the environment 10 illustrated in FIG. 4 according to another example. In this example, the application 96 does not contain the native plug-in 98-N illustrated in FIG. 4. This may occur, for example, where there is no native plug-in to provide the desired functionality. In this example, when the PWA 22-1 invokes the function invocation 64-N, which in turn invokes the bridge function 102-N, the bridge function 102-N returns an indication that the native plug-in 98-N is not available. The PWA 22-1 may then perform a fallback action, such as informing the user 90 that a picture cannot be taken, or some other action.

Figure 6:
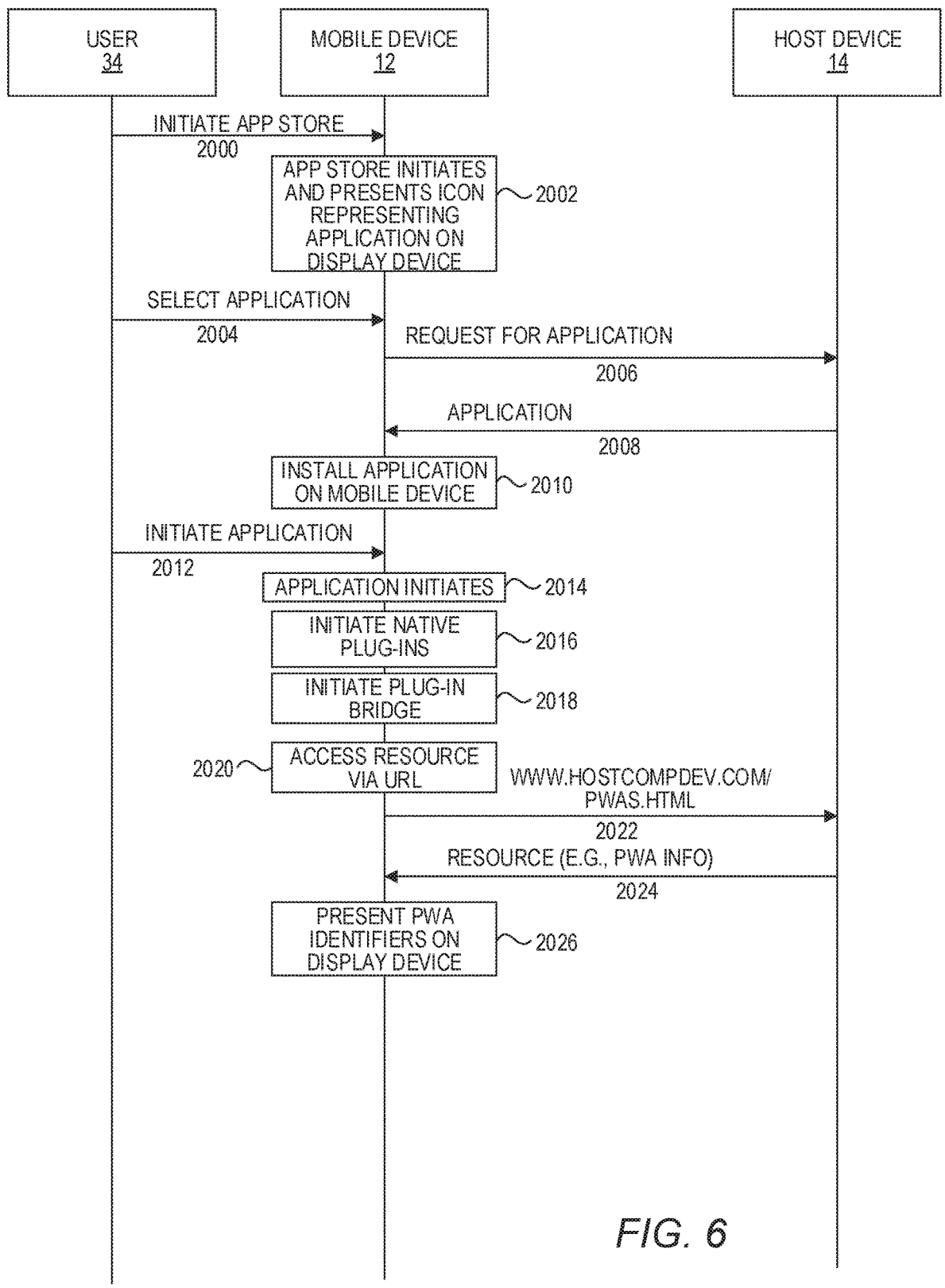
FIG. 6 is a message flow diagram illustrating a message flow for installing an application executable on a mobile device according to one example.

FIG. 6 is a message flow diagram illustrating a message flow for installing the application executable 38 on the mobile device 12 according to one example. In one example, the application executable 38 may be installed on the mobile device 12 via an application store distribution mechanism used to implement application executables by the particular mobile device operating system 32. For example, in an Apple® iOS operating system 32, the application executable 38 may be installed via the Apple® App Store. In an Android operating system 32 the application executable 38 may be installed via the Google Play store. The user 34 initiates the appropriate application store on the mobile device 12, such as by selecting an icon that corresponds to the relevant application store (FIG. 6, step 2000). The mobile device 12 initiates the application store, and the application store presents an icon that represents the application executable 38 on the display device 36 to indicate that the application executable 38 is available for installation on the mobile device 12 (FIG. 6, step 2002). The user 34 selects the icon that represents the application executable 38 (FIG. 6, step 2004). The mobile device 12 initiates a request for the application executable 38 (FIG. 6, step 2006). While for purposes of illustration the request is illustrated as being sent to the host device 14, in practice, the request could be sent to any suitable computing device that maintains a copy of the application executable 38.

The host device 14 downloads the application executable 38 onto the mobile device 12 (FIG. 6, step 2008). The mobile device 12 installs the application executable 38 on the mobile device 12, which may include, for example, the placement of an icon on a home screen of the mobile device 12 (FIG. 6, step 2010). The user 34 may then request initiation of the application 40 from the application executable 38 by selecting the icon (FIG. 6, step 2012). The application 40 initiates and initiates the native plug-ins 42-1-42-N and the plug-in bridge 48, as discussed above with regard to FIG. 1 (FIG. 6, steps 2014-2018). The application 40 accesses the URL 54 that refers to the resource 56 that identifies the plurality of PWAs 22 (FIG. 6, steps 2020, 2022). The host device 14 provides the resource 56 to the application 40 (FIG. 6, step 2024). The application 40 presents, on the display device 36, the plurality of PWA identifiers that correspond to the plurality of PWAs 22 (FIG. 6, step 2026). Processing may then continue as discussed above with regard to FIG. 1.

If the developer of the application executable 38 desires to add additional native plug-ins 42, or otherwise alter the functionality of the application executable 38, the developer revises the application executable 38 and initiates the appropriate application store upgrade process for the respective application store.

Figure 7:
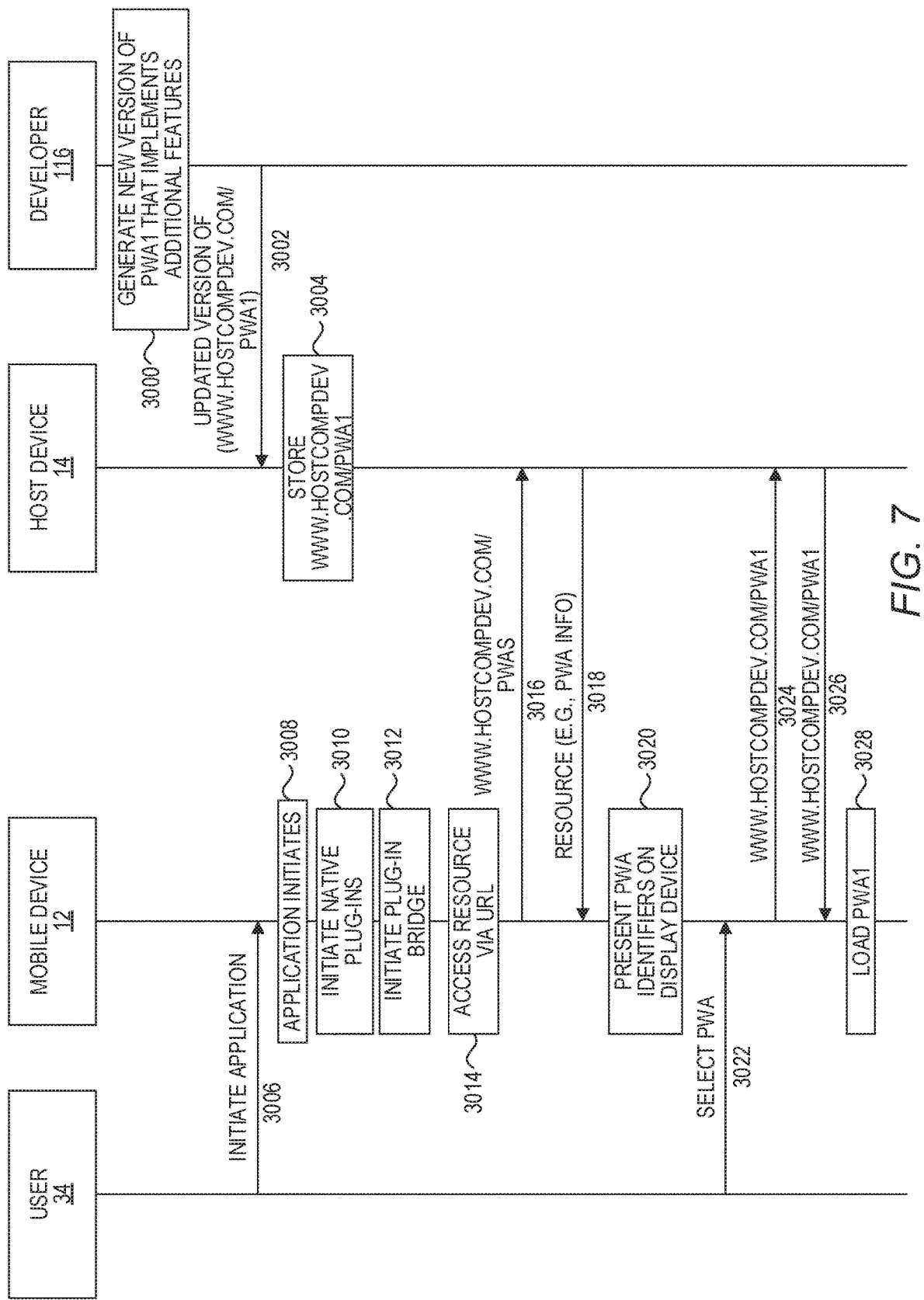
FIG. 7 is a message flow diagram illustrating a method of enhancing an existing PWA according to one example.

FIG. 7 is a message flow diagram illustrating a method of enhancing an existing PWA 22 according to one example. Assume that a developer 116 desires to implement additional functionality into the PWA 22-1. The developer 116 generates a new version of the PWA 22-1 that contains the additional features (FIG. 7, step 3000). The developer 116 then stores the new version of the PWA 22-1 onto the host device 14 (FIG. 7, steps 3002, 3004).

The user 34 requests initiation of the application 40 from the application executable 38 by selecting the icon that corresponds to the application executable 38 (FIG. 7, step 3006). The application 40 initiates and initiates the native plug-ins 42-1-42-N and the plug-in bridge 48, as discussed above with regard to FIG. 1 (FIG. 7, steps 3008-3012). The application 40 accesses the URL 54 that refers to the resource 56 that identifies the plurality of PWAs 22 (FIG. 7, steps 3014, 3016). The host device 14 provides the resource 56 to the application 40 (FIG. 7, step 3018). The application 40 presents, on the display device 36, the plurality of PWA identifiers that correspond to the plurality of PWAs 22 (FIG. 7, step 3020). The user 34 selects the PWA 22-1 (FIG. 7, step 3022). The mobile device 12 loads the new and updated version of the PWA 22-1 from the host device 14 (FIG. 7, steps 3024-3028). Processing may then continue as discussed above with regard to FIG. 1.

Figure 8:
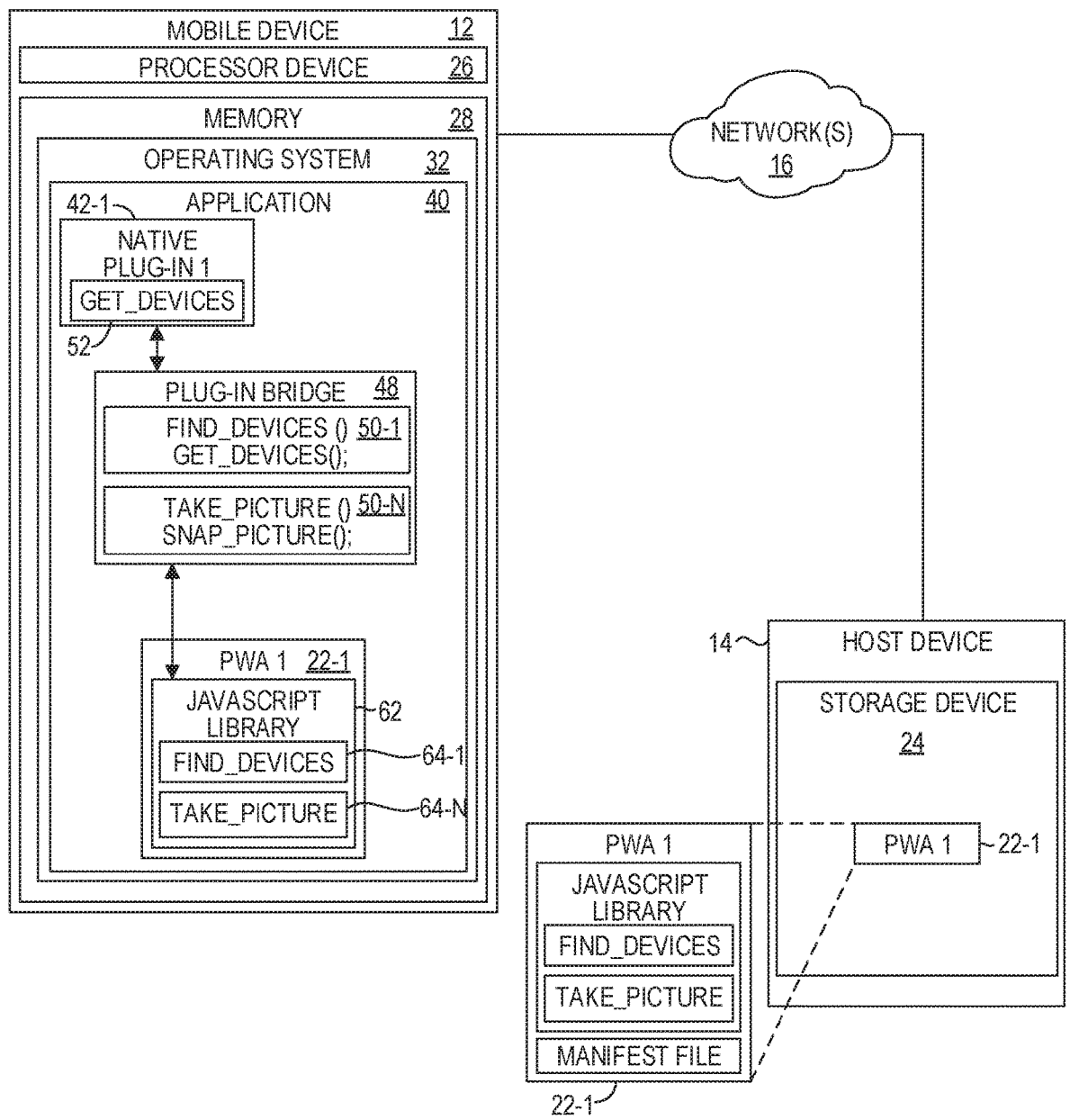
FIG. 8 is a simplified block diagram of the environment illustrated in FIG. 1, according to one example.

FIG. 8 is a simplified block diagram of the environment 10 illustrated in FIG. 1, according to one example. The environment 10 includes the memory 28 and the processor device 26. The processor device 26 is to load, by the application 40 executing in the mobile device operating system 32 of the mobile device 12, the application 40 comprising the plug-in bridge 48 and the native plug-in 42-1, the PWA 22-1 from the host device 14 that hosts the PWA 22-1. The processor device 26 is further to invoke, by the PWA 22-1, the first native plug-in 42-1 via the plug-in bridge 48 to implement an operation on the mobile device 12.

Figure 9:
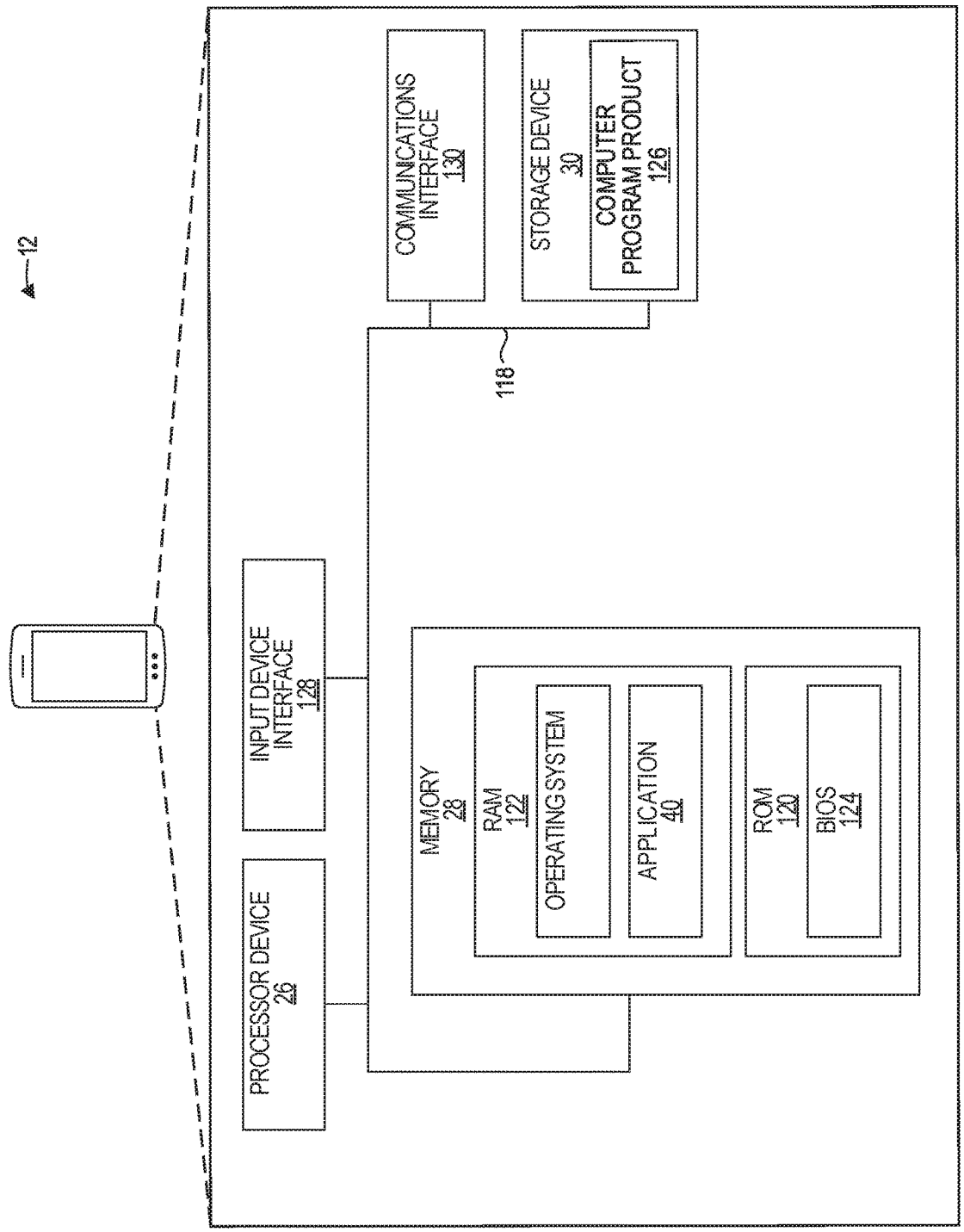
FIG. 9 is a block diagram of the mobile device illustrated in FIG. 1 according to one example.

FIG. 9 is a block diagram of the mobile device 12 suitable for implementing examples according to one example. The mobile device 12 may comprise any mobile computing or electronic device capable of including firmware, hardware, and/or executing software instructions to implement the functionality described herein, such as a laptop computing device, a smartphone, a computing tablet, or the like. The mobile device 12 includes the processor device 26, the memory 28, and a system bus 118. The system bus 118 provides an interface for system components including, but not limited to, the memory 28 and the processor device 26. The processor device 26 can be any commercially available or proprietary processor.

The system bus 118 may be any of several types of bus structures that may further interconnect to a memory bus (with or without a memory controller), a peripheral bus, and/or a local bus using any of a variety of commercially available bus architectures. The memory 28 may include non-volatile memory 120 (e.g., read-only memory (ROM), erasable programmable read-only memory (EPROM), electrically erasable programmable read-only memory (EEPROM), etc.), and volatile memory 122 (e.g., random-access memory (RAM)). A basic input/output system (BIOS) 124 may be stored in the non-volatile memory 120 and can include the basic routines that help to transfer information between elements within the mobile device 12. The volatile memory 122 may also include a high-speed RAM, such as static RAM, for caching data.

The mobile device 12 may further include or be coupled to a non-transitory computer-readable storage medium such as the storage device 30, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 30 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 30 and in the volatile memory 122, including an operating system and one or more program modules, such as the application 40, which may implement the functionality described herein in whole or in part. It is to be appreciated that the examples can be implemented with various commercially available operating systems or combinations of operating systems.

All or a portion of the examples may be implemented as a computer program product 126 stored on a transitory or non-transitory computer-usable or computer-readable storage medium, such as the storage device 30, which includes complex programming instructions, such as complex computer-readable program code, to cause the processor device 26 to carry out the steps described herein. Thus, the computer-readable program code can comprise software instructions for implementing the functionality of the examples described herein when executed on the processor device 26. The processor device 26, in conjunction with the application 40 in the volatile memory 122, may serve as a controller, or control system, for the mobile device 12 that is to implement the functionality described herein.

An operator, such as the user 34, may also be able to enter one or more configuration commands through a keyboard (not illustrated), a pointing device such as a mouse (not illustrated), or a touch-sensitive surface such as the display device 36. Such input devices may be connected to the processor device 26 through an input device interface 128 that is coupled to the system bus 118 but can be connected by other interfaces such as a parallel port, an Institute of Electrical and Electronic Engineers (IEEE) 1394 serial port, a Universal Serial Bus (USB) port, an IR interface, and the like.

The mobile device 12 may also include a communications interface 130 suitable for communicating with the network 16 as appropriate or desired.

Additional examples may include a method comprising receiving, by a host device from a mobile device having a mobile device operating system, a request for an application comprising a plug-in bridge and a first native plug-in, sending, by the host device to the mobile device, the application, receiving, by the host device from the application executing on the mobile device, a request for a PWA, and sending, by the host device to the application, the PWA.

Individuals will recognize improvements and modifications to the preferred examples of the disclosure. All such improvements and modifications are considered within the scope of the concepts disclosed herein and the claims that follow.

What is claimed is:

1. A method comprising:
   loading, by an application executing in a mobile device operating system of a mobile device, the application comprising a plug-in bridge and a first native plug-in, a first progressive web application (PWA) from a host device that hosts the first PWA;
   invoking, by the first PWA on the mobile device, the first native plug-in via the plug-in bridge to implement a first operation on the mobile device;
   accessing, by the application, a uniform resource locator (URL) that refers to a resource that identifies:
     a plurality of PWAs, including the first PWA; and
     a corresponding plurality of URLs, each URL corresponding to one of the plurality of PWAs;
   presenting, on a display device, a plurality of PWA identifiers that correspond to the plurality of PWAs;
   receiving user input that selects a first PWA identifier that corresponds to the first PWA; and
   in response to receiving the user input, loading the first PWA from the host device.

2. The method of claim 1 wherein the plug-in bridge comprises a bridge function that is invocable by the first PWA and, in response to being invoked by the first PWA, the bridge function is to invoke a plug-in function of the first native plug-in, and wherein invoking, by the first PWA on the mobile device, the first native plug-in via the plug-in bridge to implement the first operation on the mobile device comprises invoking the bridge function.

3. The method of claim 1 wherein the first native plug-in comprises executable code instructions that comprise machine code that is directly executable, without interpretation or compiling, by a processor device of the mobile device.

4. The method of claim 1 further comprising:
   attempting, by the first PWA, to invoke a second native plug-in via the plug-in bridge to implement a second operation on the mobile device; and
   receiving, from the plug-in bridge, an indication from the plug-in bridge that the second native plug-in is not available.

5. The method of claim 1 wherein the first PWA comprises a JavaScript Object Notation (JSON) manifest file.

6. The method of claim 1 wherein the first PWA initiates at least one background service worker.

7. The method of claim 1 further comprising:
   receiving, by the application, user input that selects a second PWA identifier that corresponds to a second PWA; and
   in response to receiving the user input that selects the second PWA identifier:
     loading the second PWA from the host device; and
     invoking, by the second PWA on the mobile device, the first native plug-in via the plug-in bridge to implement the first operation on the mobile device.

8. The method of claim 1 wherein, in response to the invocation of the first native plug-in via the plug-in bridge, the first native plug-in returns a plurality of identifiers, each identifier corresponding to one of a plurality of Bluetooth devices actively connected to the mobile device.

9. The method of claim 1 further comprising:
   invoking, by the first PWA on the mobile device, a second native plug-in via the plug-in bridge to implement a second operation on the mobile device.

10. The method of claim 1 further comprising:
    prior to loading the first PWA from the host device, initiating, by the application, the first native plug-in.

11. A mobile device, comprising:
    a memory; and
    a processor device coupled to the memory to:
      load, by an application executing in a mobile device operating system of the mobile device, the application comprising a plug-in bridge and a first native plug-in, a first progressive web application (PWA) from a host device that hosts the first PWA;
      invoke, by the first PWA, the first native plug-in via the plug-in bridge to implement a first operation on the mobile device;
      access, by the application, a uniform resource locator (URL) that refers to a resource that identifies:
        a plurality of PWAs, including the first PWA; and
        a corresponding plurality of URLs, each URL corresponding to one of the plurality of PWAs;
      present, on a display device, a plurality of PWA identifiers that correspond to the plurality of PWAs;
      receive user input that selects a first PWA identifier that corresponds to the first PWA; and
      in response to receiving the user input, load the first PWA from the host device.

12. The mobile device of claim 11 wherein the plug-in bridge comprises a bridge function that is invocable by the first PWA and, in response to being invoked by the first PWA, the bridge function is to invoke a plug-in function of the first native plug-in, and wherein to invoke, by the first PWA, the first native plug-in via the plug-in bridge to implement the first operation on the mobile device, the processor device is to invoke, by the first PWA, the bridge function.

13. The mobile device of claim 11 wherein the processor device is further to:
  receive, by the application, user input that selects a second PWA identifier that corresponds to a second PWA; and
  in response to receiving the user input that selects the second PWA identifier:
    load the second PWA from the host device; and
    invoke, by the second PWA, the first native plug-in via the plug-in bridge to implement the first operation on the mobile device.

14. The mobile device of claim 11 wherein the processor device is further to:
  invoke, by the first PWA, a second native plug-in via the plug-in bridge to implement a second operation on the mobile device.

15. A computer program product stored on a non-transitory computer-readable storage medium and including instructions to cause a processor device to:
  load, by an application executing in a mobile device operating system of a mobile device, the application comprising a plug-in bridge and a first native plug-in, a first progressive web application (PWA) from a host device that hosts the first PWA;
  invoke, by the first PWA on the mobile device, the first native plug-in via the plug-in bridge to implement a first operation on the mobile device; and
  access, by the application, a uniform resource locator (URL) that refers to a resource that identifies:
    a plurality of PWAs, including the first PWA; and
    a corresponding plurality of URLs, each URL corresponding to one of the plurality of PWAs;
  present, on a display device, a plurality of PWA identifiers that correspond to the plurality of PWAs;
  receive user input that selects a PWA identifier that corresponds to the first PWA; and
  in response to receiving the user input, load the first PWA from the host device.

16. The computer program product of claim 15 wherein the plug-in bridge comprises a bridge function that is invocable by the first PWA and, in response to being invoked by the first PWA, the bridge function is to invoke a plug-in function of the first native plug-in, and wherein to invoke, by the first PWA on the mobile device, the first native plug-in via the plug-in bridge to implement the first operation on the mobile device, the instructions are further configured to cause the processor device to invoke, by the first PWA, the bridge function.

17. The computer program product of claim 15 wherein the instructions further cause the processor device to:
  invoke, by the first PWA on the mobile device, a second native plug-in via the plug-in bridge to implement a second operation on the mobile device.

* * * * *